3,390,528
FLUID THRUST CONTROL SYSTEM
William L. Howell, West Palm Beach, Harvey B. Jansen, Jupiter, and Eugene N. Lehmann, Juno Beach, Fla., assignors to United Aircraft Corporation, East Hartford, Conn., a corporation of Delaware
Filed Sept. 8, 1966, Ser. No. 578,397
21 Claims. (Cl. 60—243)

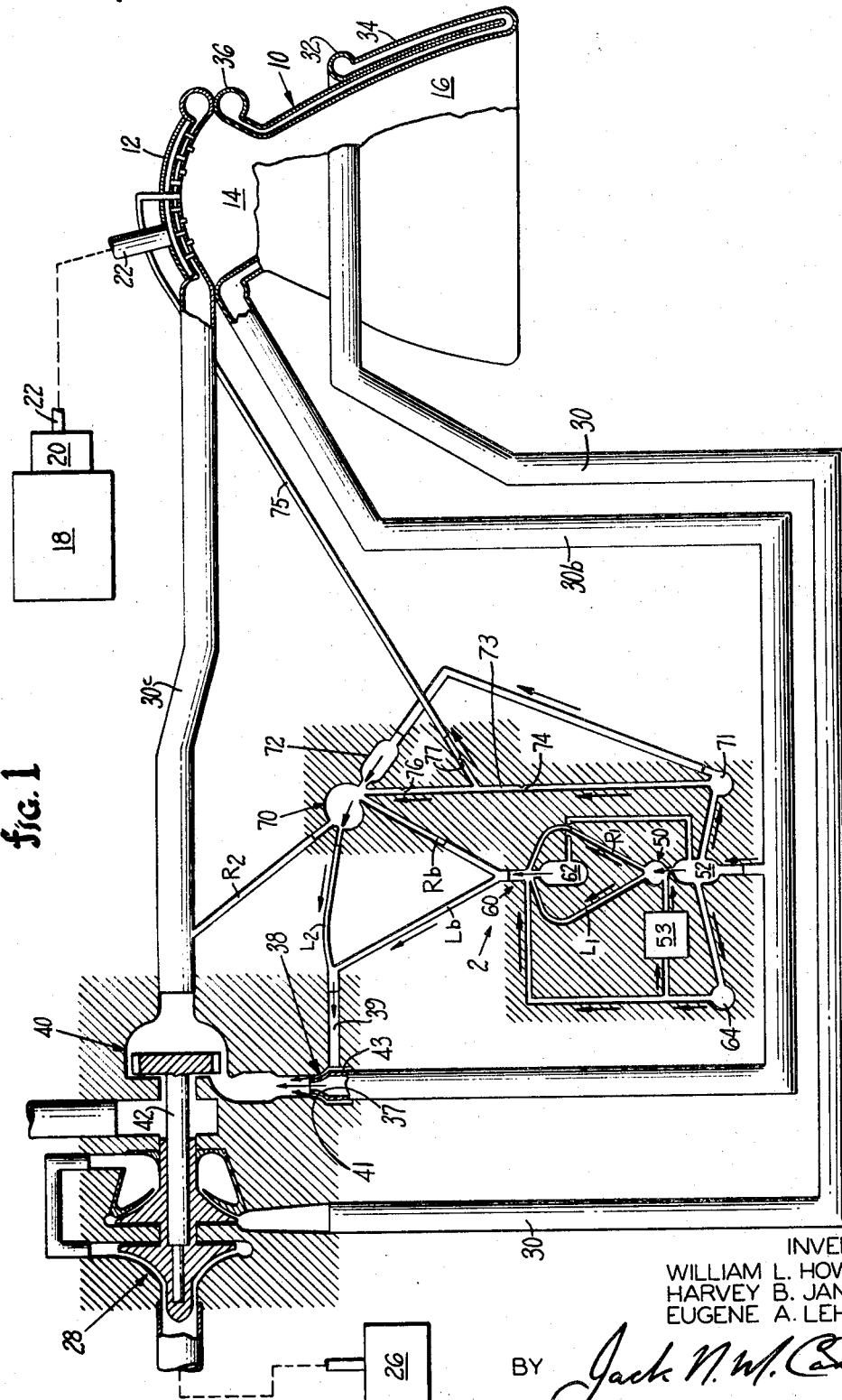

This invention relates to a pure fluid thrust control system for a liquid rocket engine and more particularly for a pump-fed regeneratively cooled liquid rocket engine. The invention described herein was made in the performance of work under a NASA contract and is subject to the provisions of section 305 of the National Aeronautics and Space Act of 1958, Public Law 85-568 (72 Stat. 435; 42 U.S.C. 2457).

The thrust generated by a rocket engine of fixed nozzle geometry is directly related to the combustion pressure of the engine, and combustion chamber pressure is a function of the amounts of propellants delivered to the combustion chamber. Combustion chamber pressure is a critical quantity and must be prevented from exceeding a predetermined maximum value for a variety of reasons. For example, the combustion chamber pressure must be controlled so that the correct thrust is generated to properly fulfill the mission of the rocket. Also, the structural characteristics of the material of which the combustion chamber is constructed require that the combustion chamber pressure be controlled to avoid overstressing of the walls of the combustion chamber. Further, this chamber pressure must be controlled to prevent overstressing the engine-vehicle mounting structure.

The present invention is contemplated for use in a pump-fed liquid rocket system wherein the pumps are driven by a turbine which uses one of the propellants as a motor fluid for the turbine, the propellant being placed in heat exchange relationship with the combustion chamber prior to being diverted to the turbine, and where the control is designed for point operation to maintain one steady-state operating condition. When the pumps are allowed to accelerate freely from the start of the engine until the operating levels of the thrust and combustion chamber pressure are reached, and a control then becomes effective to maintain the engine at its operating level by regulating the output from the pumps, thereby controlling combustion chamber pressure and thrust; as the engine nears the operating condition there is a tendency for thrust and combustion chamber pressure to seriously exceed the predetermined operating level before the control system becomes effective, known as pressure or thrust overshoot. As a result, the control acts to momentarily reduce combustion chamber pressure and thrust below the operating level, and several such oscillations above and below the operating condition may occur before steady-state operation is reached. This condition seriously impairs the performance of the rocket, and the elimination or minimization of this condition will significantly improve engine performance. The present invention operates to that end by modifying the acceleration of the pumps and the attendant increases in combustion chamber pressure and thrust prior to reaching the operating condition, and then further modulation of pump output occurs to maintain the desired operating condition.

It is an object of this invention to provide a thrust control for a rocket thrust chamber having no moving parts which will maintain a substantially constant thrust with stability over a range of transient conditions.

It is another object of this invention to provide a thrust control containing a proportional fluid amplifier and bistable fluid amplifier to perform the function of controlling thrust overshoot in the starting of a liquid rocket engine and taking it to a predetermined thrust.

It is a further object of this invention to provide a thrust control having a proportional fluid amplifier for performing the function of regulating turbine bypass flow to maintain a substantially constant thrust during steady-state operation.

It is another object of this invention to provide an ejector type pump in the line between the liquid hydrogen rocket nozzle heat exchanger and the turbine driving the fuel pump to aid in bringing the fluid at this point back into the regular system when it is not bypassed.

It is a further object of this invention to provide a thrust control which will function in environments too severe for mechanical controls.

It is another object of this invention to provide a thrust control having flexibility regarding its gain and response.

It is a further object of this invention to provide a thrust control which will reduce the weight of the overall engine.

Other objects and advantages will be apparent from the following specification and drawings.

FIGURE 1 is a schematic view of the control and engine system showing initial start transient flow paths through the thrust control.

Figure 3:
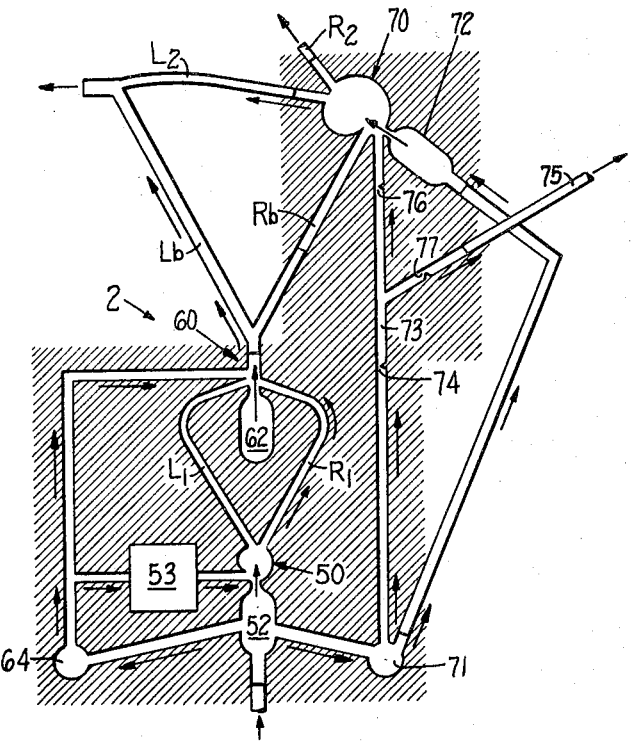
FIGURE 3 is a schematic view of the control showing steady-state flow paths.

As viewed in FIGURE 1, the fluid thrust control unit 2 is shown incorporated in a liquid rocket engine 10 of the type shown in U.S. Patent No. 3,094,838 or U.S. Patent No. 3,204,402. The liquid rocket engine 10 has a propellant injector head 12, a combustion chamber 14 and a thrust nozzle 16. Engine 10 can use a fuel and oxidizer of any suitable type. For example, cryogenic liquids such as hydrogen and oxygen can be used. The oxidizer is stored in a tank 18 and pumped to the injector head 12 by oxidizer pump 20 through line 22. The injector head can be of the type shown in U.S. Patent No. 3,221,499 or U.S. Patnet No. 3,085,394.

Fuel is stored in tank 26 and is delivered by pump 28 through line 30 to a manifold 32 around the thrust nozzle 16. The fuel is then heated, and combustion chamber and nozzle cooled, by the fuel passing through a jacket 34 which is in heat exchange relationship with the interior of the combustion chamber 14 and nozzle 16. Fuel is then collected in gaseous form in manifold 36; it then passes through line 30b which includes an ejector type pump unit 38, is expanded through turbine 40 and thence passes through line 30c to injector head 12. The ejector type pump unit 38 is of a type well known in the art. The end of conduit 30b is formed as a nozzle at 37 and has its discharge end located in a constricted or diverging portion 41 of the inlet to the turbine 40. An annular chamber 43 is formed around the end of the conduit 30b adjacent the nozzle 37. It is this area from which fluid is pulled by the fluid exiting from nozzle 37 into the portion 41 whereby all the fluid then passes through the turbine 40. Turbine 40 is drivingly connected to fuel pump 28 by shaft 42. This turbine 40 is also drivingly connected to the oxidizer pump 20 to drive both pumps at speeds which will provide fuel and oxidizer to the injector head 12 at a desired fuel-oxidizer ratio in the combustion chamber 14.

The fluid thrust control unit 2 operates to take a portion of the flow from conduit 30b upstream of the ejector unit 38 and replace it back in conduit 30b at ejector 38 or downstream of the turbine 40 into conduit 30c. The amount of hydrogen redirected back into 30b or bypassed into 30c is determined by the pressure in the combustion chamber 14 to maintain a desired thrust output of the rocket engine 10. The fluid thrust control unit 2 comprises five main parts along with connecting lines. They are the following: (1) a first proportional amplifier 50; (2) a tuned chamber 53 associated with said first proportional amplifier; (3) a bistable amplifier 60; (4) a second proportional amplifier 70; and (5) the ejector unit 38 located upstream of the turbine 40. While bistable and proportional amplifiers are well known, a small description will be set forth. In a bistable amplifier, some pressure differential induced across the power nozzle flow by a control jet causes all of the power nozzle flow to exit through one or the other of two outlets depending on the direction of the control jet. In a proportional amplifier, some pressure differential induced across the power nozzle flow by a control jet causes some portion of the power nozzle flow to exit through one outlet with the remainder exiting through the other outlet. Fluid amplifiers in general are discussed in U.S. Patent No. 3,233,622 and U.S. Patent No. 3,001,539.

The parts of the fluid thrust control unit 2 are interconnected in the following manner. The power fluid for operating the thrust control unit 2 is taken from the conduit 30b at a point upstream of the ejector unit 38. This fluid is directed at its pressure $P_{eu}$ to a chamber 52; from chamber 52 this fluid is directed at its pressure in turn to chambers 62, 64 and 71. From chamber 64 this fluid is directed at the pressure $P_{eu}$ to the inlet of the tuned chamber 53 and to the interaction chamber of bistable amplifier 60 to act as a control jet. From chamber 71, at this same pressure, this fluid is directed to a chamber 72 and to an orifice 74 leading to a chamber 73.

The first proportional amplifier 50 has its fluid power nozzle connected to chamber 52 so the fluid therein at the pressure $P_{eu}$ will be directed into the interaction chamber. The outlet of the tuned chamber 53 is connected to the interaction chamber of proportional amplifier 50 so that the fluid directed therethrough, after it has been given a lag function, will act as a control jet. Two output legs $L_1$ and $R_1$ extend from the interaction chamber. The free end of the leg $L_1$ is connected to the interaction chamber of bistable amplifier 60 so that fluid directed therethrough will act as a second control jet from the same side as the fluid under pressure $P_{eu}$ directed thereto from chamber 64. The free end of the other leg $R_1$ is connected to the interaction chamber of the bistable valve 60 so that fluid directed therethrough will act as a control jet in the opposite direction from the other two control jets connected thereto.

The bistable amplifier 60 has its fluid power nozzle connected to chamber 62 so that the fluid therein at the pressure $P_{eu}$ will be directed into the interaction chamber. This power fluid is acted upon by the control jets which are connected to its interaction chamber as set forth hereinbefore. Two output legs $L_b$ and $R_b$ extend from this interaction chamber. The free end of the leg $L_b$ is connected to a passageway 39 which is directed to the annular chamber 43 located around the nozzle 37 formed from the end of the conduit 30b. The free end of the other leg $R_b$ is connected to the interaction chamber of the second proportional amplifier 70 so that fluid directed therethrough will act as a control jet. Chamber 73 is also connected to the interaction chamber of the second proportional amplifier so that fluid directed from said chamber through orifice 76 will act as a control jet from the same side as the fluid directed through leg $R_b$.

The second proportional amplifier 70 has its fluid power nozzle connected to chamber 72 so that fluid therein at the pressure $P_{eu}$ will be directed into the interaction chamber. This power fluid is acted upon by the control jets which are connected to the interaction chamber as set forth hereinbefore. Two output legs $L_2$ and $R_2$ extend from this interaction chamber. The free end of leg $L_2$ is connected to passageway 39 adjacent the connection of the output leg $L_b$ of bistable amplifier 60. The free end of the other leg $R_2$ is connected to the conduit 30c downstream of the outlet of turbine 40. This leg $R_2$ can be called the turbine bypass flow line, since only fluid passing through this line as a result of the other fluid action within the thrust control unit 2 is the fluid which does bypass the turbine 40.

The pressure in combustion chamber 14 is transmitted to chamber 73 through a conduit 75 and orifice 77. The conduit 75 opens on to the face of the injector head 12. As can be seen, the pressure $P_{c3}$ in the chamber 73 is controlled by the pressure $P_c$ of the combustion chamber 14.

OPERATION

As the rocket engine is started, the entire fluid system begins to flow as shown in FIGURE 1. Since the starting system is not part of this invention, one has not been shown. Hydrogen is passed through the jacket 34 and therefrom through turbine 40 to the injector head 12 and injected into the combustion chamber 14 and oxygen is pumped to the injector head and from there injected into the combustion chamber. An igniter, not shown, ignites the mixture in the combustion chamber and it is discharged through the nozzle 16.

The proportional amplifier 50 is designed so that the flow from the power nozzle, when there is no effective control jet acting on the power fluid entering the interaction chamber, that is, in this case when no controlling fluid is directed from the outlet of the tuned chamber 53, splits evenly into the output legs $L_1$ and $R_1$. Therefore, during the early part of the starting operation, when the flow from the power nozzle splits evenly into the output legs $L_1$ and $R_1$ due to the lag function in tuned chamber 53, proportional amplifier 50 will not cause any disturbance in the power nozzle flow of the bistable amplifier 60.

The bistable amplifier 60 is designed so that the power nozzle flow will exit through $L_b$ with the flow split down legs $L_1$ and $R_1$. As the pressure in conduit 30b builds up, $P_{eu}$, the pressure of the power nozzle flow will increase as will the pressure of the control jet coming from manifold 64. As these two rise in pressure, the momentum of the control jet does not become sufficient to trip the flow from leg $L_b$ to leg $R_b$ until a predetermined relationship has been reached, which occurs when $P_{eu}$ has reached a specified percentage of its upper limit (or maximum value). This percentage will usually run between 80% and 95%.

The proportional amplifier 70 is designed to have the power nozzle flow exit through leg $L_2$ because no control jet is entering the interaction chamber from the leg $R_b$ and the control jet from orifice 76 does not have enough power to displace the power nozzle flow which is, as was stated hereinbefore, inclined towards the left aperture as a matter of design. This permits the turbine to have maximum flow for starting.

Figure 2:
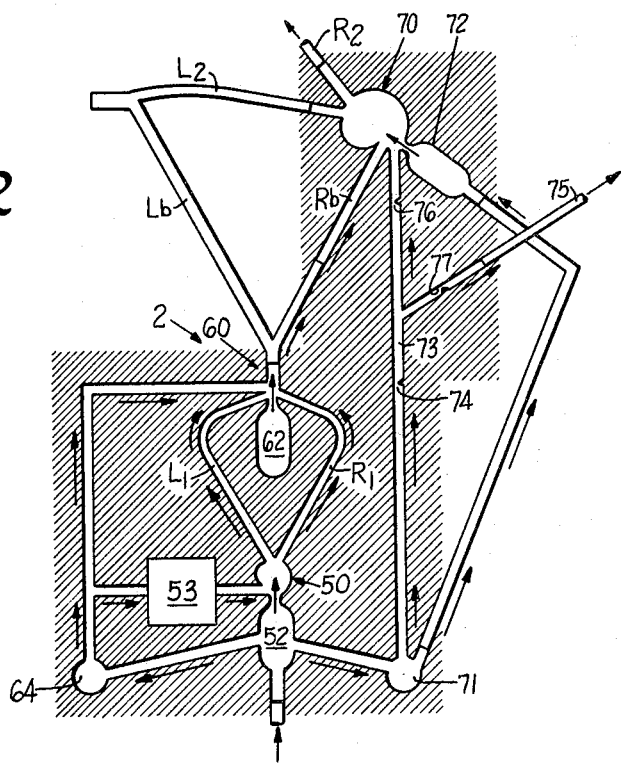
FIGURE 2 is a schematic view of the control showing limiting thrust overshoot flow paths.

This operation of the fluid thrust control for starting while the pressure in 30b, $P_{eu}$, is building up, places an even flow split into the output legs $L_1$ and $R_1$ of the proportional amplifier 50 with no effective control jet issuing into the interaction chamber from the output of the tuned chamber 53. The bistable amplifier 60 maintains the flow in the leg $L_b$ until the control jet issuing from manifold 64 which builds up with the power nozzle flow achieves enough momentum to cause power nozzle flow to exit through the leg $R_b$ at which point the initial starting flows will change to those shown in FIGURE 2. Up to this time, the proportional amplifier 70 exits all its flow down leg $L_2$ to passageway 39 and from there is sucked into the inlet to the turbine by the ejector 37. It can be seen that during this time, the total flow through the thrust control unit is directed back into the flow path from the manifold 36 to the inlet of the turbine 40 to enable maximum engine acceleration. It is noted that approximately 10% of the total fluid flow passes through the thrust control unit.

As the momentum of the control jet entering the interaction chamber of bistable amplifier 60 from manifold 64 overcomes the "locked-in" effect of the flow in leg $L_b$, the power nozzle flow "flops" over into leg $R_b$. This flow through leg $R_b$ then enters into the interaction chamber of proportional amplifier 70 and acts to "flop" the flow from the power nozzle from leg $L_2$ to leg $R_2$. This flow then passes to the conduit 30c which is located downstream of the outlet of turbine 40. It can be seen at this point that all of the thrust control flow is now bypassing the turbine 40 and, therefore, the turbine acceleration will be decreased and the rate of build-up of propellants pumped into the combustion chamber 14 will be decreased and the rate of increase in chamber pressure will level off to prevent an "overshoot" condition. At this point, the tuned chamber 53 permits flow therethrough to provide a control jet into the interaction chamber of proportional amplifier 50 to increase flow in $R_1$. With the reduction of momentum of the control jet which issued as a result of the flow in $L_1$ coupled with the resultant increase flow of the control jet associated with leg $R_1$, the flow through leg $R_b$ of the bistable amplifier 60 is "flopped" back into leg $L_b$. The proportional amplifier 70 will then have its power jet flow moved from the leg $R_2$ toward the leg $L_2$ in a manner to be hereinafter described.

The system is now in position for steady-state operation as shown in FIGURE 3. As the fluid nozzle flow moves from the leg $R_2$ towards the leg $L_2$ of the proportional amplifier 70, the momentum of the control jet connected to the chamber 73 through orifice 76 has reached a magnitude such that the control jet at the pressure $P_{c3}$ will control the amounts in legs $L_2$ and $R_2$. During the steady-state operation, the proportional amplifier 50 and the bistable amplifier 60 have no effect on controlling thrust. The thrust of the rocket 10 is controlled by the proportional amplifier 70 in accordance with chamber pressure of the rocket sensed through the chamber 73. This chamber pressure, $P_{c3}$, changes the control jet pressure connected thereto which enters the interaction chamber of proportional amplifier 70 thereby changing the amount of power jet flow into the legs $L_2$ and $R_2$, thereby changing turbine bypass flow to maintain a constant chamber pressure.

It is to be understood that the invention is not limited to the specific embodiments herein illustrated and described, but may be used in other ways without departure from its spirit as defined by the following claims.

We claim:
1. A combustion system including a combustion chamber, a supply of propellant, means for pressurizing said propellant comprising a pump, a turbine for driving the pump, means for adding energy to said propellant, conduit means for conducting propellant from said adding means to said combustion chamber, said turbine being located in said conduit means, an ejector means in said conduit means upstream of said turbine, a pure fluid control having first and second output legs and an inlet connected to said conduit means for conducting propellant around said turbine thereby to regulate the amount of propellant passing thrugh said turbine, said first output leg being connected to said ejector means for entry of propellant from said control into said conduit means, said second output leg being connected to said combustion chamber for directing propellant thereto, and said inlet being connected to said conduit means between said adding means and said ejector means for entry of propellant into said fluid control.

2. A combination as set forth in claim 1 whereby said fluid control includes:
   (a) means directing said propellant to said first output leg during starting of said system, and
   (b) means for directing said propellant to said second output leg at a predetermined combustion chamber operating parameter.

3. A combination as set forth in claim 2 wherein said fluid control includes:
   (c) means for redirecting said propellant to said first output leg at a predetermined time lag after said propellant has been directed to said second output leg.

4. A combination as set forth in claim 1 wherein said means for adding energy is a heat exchanger which heats said propellant and cools said combustion chamber.

5. A combination as set forth in claim 4 wherein said heat exchanger comprises a conduit means forming a portion of said combustion chamber with said propellant flowing therethrough from said pump.

6. A combination as set forth in claim 1 wherein said pure fluid control comprises:
   (a) a proportional fluid amplifier having a power source, interaction chamber, third and fourth output legs, and a first control jet opening,
   (b) said proportional amplifier being constructed for an even flow split from said power source to said third and fourth output legs with no effective control jet,
   (c) a bistable fluid amplifier having a power source, interaction chamber, first and second output legs, second and third control jet openings on one side of the interaction chamber and a fourth control jet opening on the opposite side of the interaction chamber,
   (d) said bistable amplifier being constructed for the flow to pass through the first output leg with flow being equally passed through said third and fourth control jet openings and no effective flow through said second control jet opening,
   (e) said third output leg being operatively connected to said third control jet opening and said fourth output leg being operatively connected to said fourth control jet opening, and
   (f) said power sources being connected to said inlet.

7. A combination as set forth in claim 6 wherein said pure fluid control comprises:
   (g) means operatively connected to said second control jet opening for directing an actuating fluid thereto for directing the power flow to said second output leg, and
   (h) means operatively connected to said first control jet opening for directing an actuating fluid thereto for directing the power flow to said first output leg.

8. A combination as set forth in claim 6 wherein said pure fluid control comprises:
   (g) means operatively connecting said inlet to said second control jet opening for directing said propellant thereto for directing the power flow to said second output leg, and
   (h) means operatively connecting said inlet to said first control jet opening for directing said propellant thereto after a time delay for directing the power flow to said first output leg.

9. A combination as set forth in claim 5 wherein said pure fluid control comprises:
   (a) a proportional fluid amplifier having a power source, interaction chamber, third and fourth output legs, and a first control jet opening,
   (b) said proportional amplifier being constructed for an even flow split from said power source to said third and fourth output legs with no effective control jet,
   (c) a bistable fluid amplifier having a power source, interaction chamber, first and second output legs, second and third control jet openings on one side of the interaction chamber and a fourth control jet opening on the opposite side of the interaction chamber,
   (d) said bistable amplifier being constructed for the flow to pass through the first output leg with flow being equally passed through said third and fourth control jet openings, and no effective flow through said second control jet opening,
   (e) said third output leg being operatively connected to said third control jet opening and said fourth output leg being operatively connected to said fourth control jet opening, (f) said power sources being connected to said inlet, (g) means operatively connecting said inlet to said second control jet opening for directing said propellant thereto for directing the power flow to said second output leg, and (h) means operatively connecting said inlet to said first control jet opening for directing said propellant thereto after a time delay for directing the power flow to said first output leg.

10. In combination in a liquid rocket engine,
(1) an injector head,
(2) a combustion chamber connected thereto,
(3) an exhaust nozzle for said combustion chamber,
(4) means for supplying a propellant flow to said injector head,
   (a) said supplying means including a source of propellant under pressure,
   (b) said source including a pump,
   (c) said pump having a turbine drive means,
(5) means for adding energy to said propellant downstream of said pump,
(6) said turbine drive means having a turbine driven by said propellant downstream of said energy adding means,
(7) pure fluid means for controlling the propellant flow to said injector head, said pure fluid means including:
   (a) a propotional fluid amplifier having a power source, interaction chamber, first and second output legs, and a first control jet opening,
   (b) said propotional amplifier being constructed for an even flow split from said power source to said first and second output legs with no effective control jet,
   (c) a bistable fluid amplifier having a power source, interaction chamber, third and fourth output legs, second and third control jet openings on one side of the interaction chamber and a fourth control jet opening on the opposite side of the interaction chamber,
   (d) said bistable amplifier being constructed for the flow to pass through the third output leg with flow being equally passed through said third and fourth control jet openings and no effective flow through said second control jet opening,
   (e) said first output leg being operatively connected to said third control jet opening and said second output leg being operatively connected to said fourth control jet opening,
   (f) said third output leg being operatively connected to said supplying means downstream of said energy adding means and upstream of said turbine,
   (g) said fourth output leg being operatively connected to said supplying means downstream of said turbine,
   (h) means operatively connected to said second control jet opening for directing an actuating fluid thereto for directing the power flow to said fourth output leg, and
   (i) means operatively connected to said first control jet opening for directing an actuating fluid thereto for directing the power flow to said third output leg.

11. A combination as set forth in claim 10 wherein said propellant supplying means includes an ejector means between said adding means and said turbine, with said third output leg being operatively connected to said ejector means for entry of propellant from said controlling means into said propellant supplying means.

12. A combination as set forth in claim 10 wherein said power sources are connected to said propellant supplying means between said adding means and the place where said third output leg is operatively connected thereto.

13. A combination as set forth in claim 10 wherein element (h) includes means responsive to an engine operating parameter for directing the actuating fluid to the second control jet opening and element (i) includes time relay means for directing an actuating fluid to said first control jet opening a predetermined time after said actuating fluid has been directed to the second control jet opening.

14. A combination as set forth in claim 10 wherein said energy adding means comprises a conduit means forming a portion of said combustion chamber with said propellant flowing therethrough from said pump.

15. A combination as set forth in claim 14 wherein element (h) includes means connecting said second control jet opening to said propellant flow downstream of said conduit means and element (i) includes time delay propellant flow downstream of said conduit means a predetermined time after said propellant flow has been directed to the second control jet opening.

16. In combination in a liquid rocket engine,
(1) an injector head,
(2) a combustion chamber connected thereto,
(3) an exhaust nozzle for said combustion chamber,
(4) means for supplying a propellant flow to said injector head,
   (a) said supplying means including a source of propellant under pressure,
   (b) said source including a pump,
   (c) said pump having a turbine drive means,
(5) means for adding energy to said propellant downstream of said pump,
(6) said turbine drive means having a turbine driven by said propellant downstream of said energy adding means,
(7) pure fluid means for controlling the propellant flow to said injector head, said pure fluid means including:
   (a) a first proportional fluid amplifier having a power source, interaction chamber, first and second output legs, and a first control jet opening,
   (b) said first proportional amplifier being constructed for an even flow split from said power source to said first and second output legs with no effective control jet,
   (c) a bistable fluid amplifier having a power source, interaction chamber, third and fourth output legs, second and third control jet openings on one side of the interaction chamber and a fourth control jet opening on the opposite side of the interaction chamber,
   (d) said bistable amplifier being constructed for the flow from its power source to pass through the third output leg with flow being equally passed through said third and fourth control jet openings and no effective flow through said second control jet opening,
   (e) a second proportional fluid amplifier having a power source, interaction chamber, fifth and sixth output legs, and fourth and fifth control jet openings on one side of the interaction chamber,
   (f) said second proportional amplifier being constructed for the flow from its power source to pass through the fifth output leg with no effective control jet,
   (g) said first output leg being operatively connected to said third control jet opening and said second output leg being operatively connected to said fourth control jet opening,
   (h) said third output leg being operatively connected to said supplying means downstream of said energy adding means and upstream of said turbine,
   (i) said fourth output leg being operatively connected to said fourth control jet opening, (j) said fifth output leg being operatively connected to said supplying means downstream of said energy adding means and upstream of said turbine, (k) said sixth output leg being operatively connected to said supplying means downstream of said turbine, (l) means operatively connected to said second control jet opening for directing an actuating fluid thereto for directing the power flow to said fourth output leg, (m) means operatively connected to said first control jet opening for directing an actuating fluid thereto for directing the power flow to said third output leg, and (n) means operatively connected to said fifth control jet opening for directing an actuating fluid thereto for directing the power flow proportionately between said sixth output leg and said fifth output leg.

17. A combination as set forth in claim 16 wherein said propellant supplying means includes an ejector means between said adding means and said turbine, with said third and fifth output legs being operatively connected to said ejector means for entry of propellant from said controlling means into said propellant supplying means.

18. A combination as set forth in claim 17 wherein element (l) includes means responsive to an engine operating parameter for directing the actuating fluid to the second control jet opening.

19. A combination as set forth in claim 17 wherein element (m) includes time delay means for directing an actuating fluid to said first control jet opening a predetermined time after said actuating fluid has been directed to the second control jet opening.

20. A combination as set forth in claim 17 wherein element (n) includes means for directing an actuating fluid to said fifth control jet opening in proportion to steady-state changes in combustion chamber pressure.

21. A combination as set forth in claim 3 wherein said fluid control includes:

(d) means for controlling the flow between said first and second output legs in proportion to steady-state changes in an engine operating parameter.

References Cited

UNITED STATES PATENTS

| | | | |
|---|---|---|---|
| 2,727,525 | 12/1955 | Harris | 137—81.5 |
| 3,161,017 | 12/1964 | Holmes | 60—240 |
| 3,292,648 | 12/1966 | Colston | 137—81.5 |

MARTIN P. SCHWADRON, *Primary Examiner.*

CARLTON R. CROYLE, *Examiner.*

D. HART, *Assistant Examiner.*

UNITED STATES PATENT OFFICE
CERTIFICATE OF CORRECTION

Patent No. 3,390,528                        July 2, 1968

William L. Howell et al.

It is certified that error appears in the above identified patent and that said Letters Patent are hereby corrected as shown below:

Column 7, lines 31 and 34, "propotional", each occurrence should read -- proportional --. Column 8, line 19, before "propellant" insert -- means connecting said first control jet opening to said --.

Signed and sealed this 18th day of November 1969.

(SEAL)
Attest:

Edward M. Fletcher, Jr.                      WILLIAM E. SCHUYLER, JR.
Attesting Officer                                Commissioner of Patents